US005213686A

United States Patent [19]

Funk et al.

[11] Patent Number: 5,213,686

[45] Date of Patent: May 25, 1993

[54] COMPRESSION FEEDER

[75] Inventors: Erwin Funk, Glens Falls, N.Y.; Rudy Koteles, Beaconsfield, Canada

[73] Assignee: Kamyr, Inc., Glens Falls, N.Y.

[21] Appl. No.: 749,945

[22] Filed: Aug. 26, 1991

[51] Int. Cl.[5] .................... B01D 33/00

[52] U.S. Cl. .................... 210/350; 210/358; 210/359; 210/402; 210/404; 100/121; 162/56; 162/58; 425/376.1; 425/466

[58] Field of Search .................... 210/107, 358, 354, 402, 210/404, 408; 100/121; 162/56, 58; 425/376.1, 466

[56] References Cited

U.S. PATENT DOCUMENTS

| | | | |
|---|---|---|---|
| 3,772,144 | 11/1973 | Luthi et al. | 162/210 |
| 3,884,749 | 5/1975 | Pankoke | 425/376.1 |
| 4,085,003 | 4/1978 | Luthi | 162/259 |
| 4,098,642 | 7/1978 | Luthi | 100/121 |
| 4,361,530 | 11/1982 | Peer | 425/466 |
| 4,534,868 | 8/1985 | Barbulescu et al. | 210/780 |
| 4,750,340 | 6/1988 | Anderson | 68/43 |
| 4,827,741 | 5/1989 | Luthi | 68/43 |

OTHER PUBLICATIONS

Kamyr "Ring® Press Information Guide", Bulletin No. KGD1804 ME0189.

*Primary Examiner*—Robert A. Dawson
*Assistant Examiner*—David Reifsnyder
*Attorney, Agent, or Firm*—Nixon & Vanderhye

[57] ABSTRACT

Compressible material is compacted into a plug by a device including a housing, solid outer wall, and restricting adjustable portion at an outlet. A root wall is rotated about an axis and conveys the material to be compressed in a channel having solid sidewalls. Without significant extraction of liquid from the material, the material is compressed until discharged in a compacted plug form from the housing outlet. A pneumatic cylinder provides an adjustable force for effecting the compaction adjacent the housing outlet. Examples of compressible materials that may be acted upon in the practice of various industrial processes include wood chips, high consistency paper pulp (cellulose pulp), wax and fibrous waste (for making artificial fireplace logs), and mud and straw (for producing building blocks or bricks).

12 Claims, 2 Drawing Sheets

COMPRESSION FEEDER

BACKGROUND AND SUMMARY OF THE INVENTION

In the practice of many industrial processes, it is desirable to compact compressible cellulosic material in a high consistency mixture during acting on the material to produce a desired end product. For example in the production of artificial fireplace logs, it is desirable to compress the wax and fibrous waste material (e.g. sawdust) prior to extruding the mass of material into logs. In the production of bricks or blocks from mud and straw, the feeding of wood chips to a refiner for the production of wood pulp, and in the feeding of high consistency pulp to high pressure treatment vessels to produce treated wood pulp, etc., compression is desirable. During compression it is not necessarily desirable to change the solids consistency of the slurry.

There is an existing commercially successful device manufactured under license of U.S. Pat. No. 4,534,868 known as the Kamyr RING ® press, manufactured by Kamyr, Inc. of Glens Falls, N.Y. The Kamyr RING ® press includes a housing with an outer solid wall, an arcuate channel having a root wall, and a rotor for rotating the root wall about a horizontal axis. The purpose of this device is to remove liquid from a mass, walls defining the channel being perforated and liquid being extracted from the fibrous suspension through the channel walls during treatment to effect dewatering.

It has been recognized, according to the present invention, that a structure such as a modified form of the Kamyr RING ® press is eminently suited for the compaction of compressible material in order to form a plug of material which is discharged from the housing. The device can be utilized for a wide variety of different industrial processes where compression is desirable. For example it can be utilized to produce a plug of wax and waste fibrous material (such as sawdust) that is fed to an extruder for making processed fireplace logs. It can also be used to compress a mixture of mud and straw into a plug that is fed to an extruder for making bricks or blocks, or for compacting wood chips before they are fed to a refiner, or for compressing high consistency cellulosic fibrous material pulp before it is fed to a high pressure treatment vessel. The plug that is formed prevents passage of vapor back through the plug, and/or forms the material being compressed into a more desirable physical configuration for easy and effective handling, and the production of an end product with a minimum of effort.

According to one aspect of the present invention there is provided a device for compacting compressible cellulosic material in a mixture. The device comprises: (a) A housing having an outer, essentially solid, wall; including a restricting adjustable portion. (b) Means defining a channel having a root wall and a pair of side walls with an open face opposite the root wall, the channel being positioned so that the open face thereof is adjacent the housing outer wall, and all of the walls defining the channel being solid so that liquid may not pass therethrough. (c) Means for moving the root wall, and at least one of the side walls, with respect to the outer wall in the dimension of elongation of the channel. (d) Means for feeding cellulosic mixture to be compressed into the channel at an inlet portion of the housing. (e) An outlet for passage of compressed cellulosic mixture out of the channel and the housing adjacent the restricting adjustable portion of the housing outer wall; and, (f) means for applying force to the restricting adjustable portion so as to control the amount of compaction of the cellulosic mixture being compressed. Preferably, the housing wall is arcuate and the root wall is an arcuate wall of a rotor, the sidewalls extending radially outwardly therefrom, the means (c) comprises means for rotating the root wall and rotor about a generally horizontal axis, and the means (f) comprises a mechanical actuator such as pneumatic cylinder.

A device according to the invention has many uses. For example the inlet thereto may be connected to a source of wax and fibrous waste material, and the outlet therefrom connected to the inlet to an artificial log extruder. Alternatively the inlet may be connected to a source of mud and straw and the outlet to a brick or block extruder; the inlet connected to a source of wood chips and the outlet connected to the inlet to a refiner for refining wood chips into pulp; or the inlet connected to a source of high consistency cellulosic fibrous material pulp and the outlet connected to a high pressure treatment vessel, etc.

In practicing the method according to the invention, the mixture of material to be compressed is introduced into the channel while the root wall is rotated about a horizontal axis. The mixture of material, without substantial liquid removal, is compressed so that a plug of compacted material forms. The plug is then discharged from the channel to whatever device it is connected to; e.g. a high pressure pulp treatment vessel where cellulosic fibrous material having a consistency of about 16% or more is being treated; a refiner where wood chips are being acted upon to be formed into wood pulp; an extruder for bricks or blocks where mud and straw are being acted upon to form bricks or blocks; or an extruder for making artificial logs where waxes and fibrous waste materials are being acted upon to produce logs for burning in fireplaces.

It is the primary object of the present invention to provide a device and method for the effective compaction of compressible material during industrial processes. This and other objects of the invention will become clear from an inspection of the detailed description of the invention and from the appended claims.

DETAILED DESCRIPTION OF THE DRAWINGS

Figure 1:
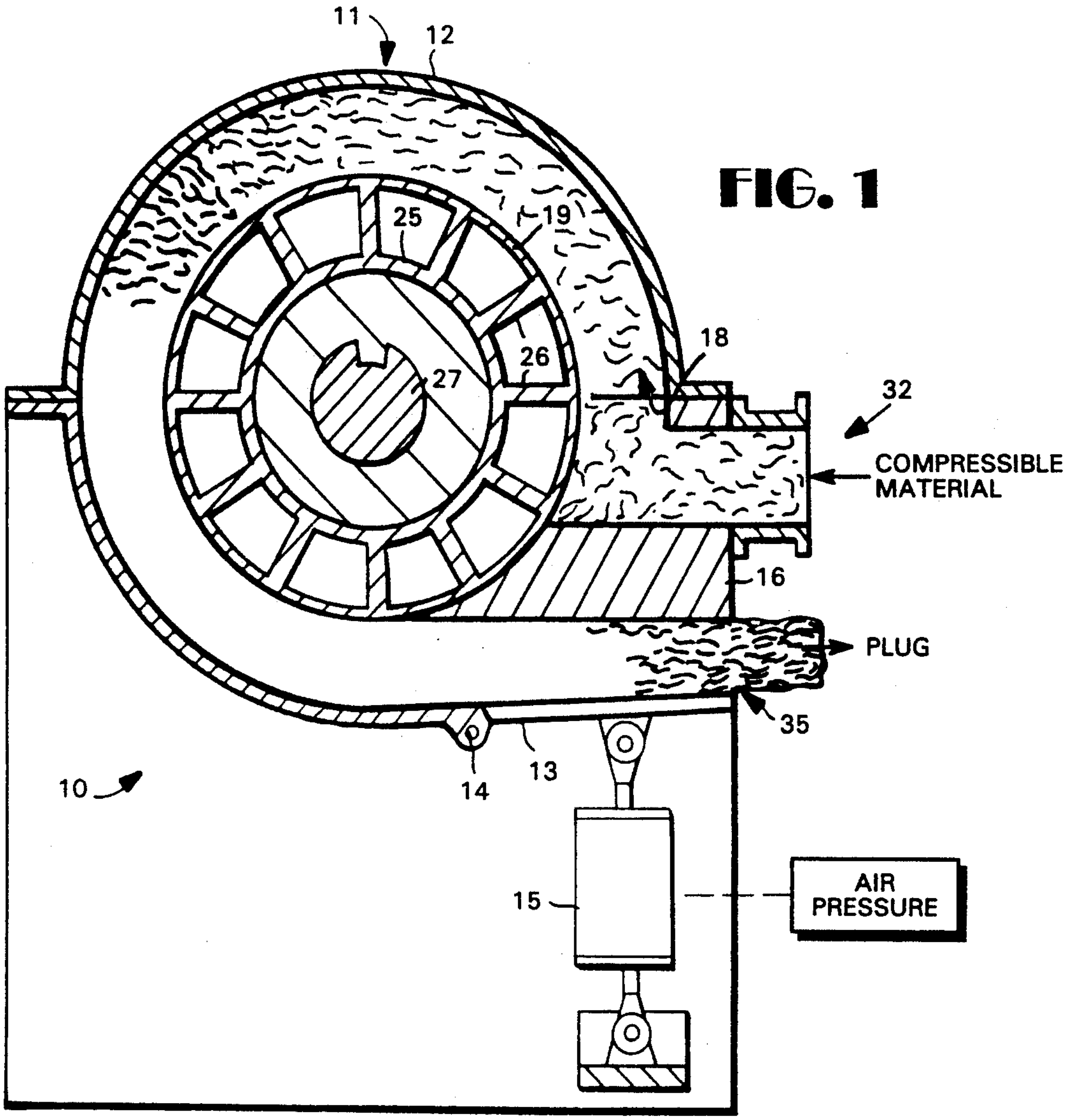
FIG. 1 is an end diagrammatic view partly in cross-section and partly in elevation of an exemplary compression feeder according to the present invention.

A device for compacting compressible material, and liquid, to reduce its volume, is illustrated generally by reference numeral 10 in FIG. 1. The device includes a integral housing 11, with an outer solid wall 12, without openings therethrough, and a restricting adjustable portion 13. The portion 13 is pivoted about point 14 and is operated by a pneumatic cylinder 15. The adjustable portion 13 restricts the material at the discharge portion of the housing between it and a doctor blade 16, and by varying the force exerted by cylinder 15, the compaction ratio of the material acted upon is varied.

Figure 2:
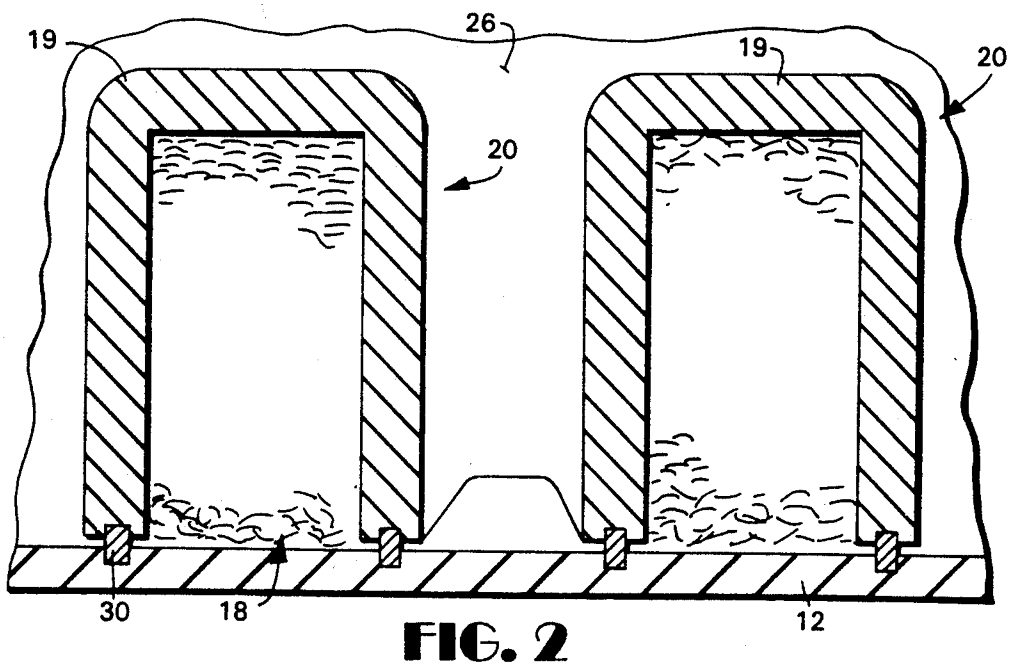
FIG. 2 is a cross-sectional detailed view of two channels in the device of FIG. 1.

The device 10 also comprises means for defining a channel 18 having a root wall 19 and a pair of side walls 20, with an open face opposite the root wall 19 (see FIG. 2). The channel 18 is positioned so that the open face thereof is adjacent the housing outer wall. All of the walls 12, 19, 20 are solid without openings therethrough, so that there is no substantial flow of liquid out of the compressible material and liquid slurry.

The device 10 also comprises means for moving the root wall 19, and at least one of the side walls 20 (and preferably—as illustrated in the drawings —both of the side walls 20) with respect to the outer wall 12 in the dimension of elongation of the channel 18. While the device 10 may be constructed as a linear device (e.g. see FIGS. 1 and 3 of U.S. Pat. No. 4,534,868), preferably it is a rotary device, and to this end the means for moving the root wall 19 comprises a rotor including an inner tubular portion 25 having radially extending ribs 26 emanating outwardly therefrom, the ribs 26 being connected to the root wall 19 and through it to the side walls 20. The inner tube 25 is keyed to a shaft 27 mounted by bearings (not shown) for rotation about a generally horizontal axis, powered by a motor (not shown). The motor will rotate the shaft 27, tube 25, with its associated root wall 19, etc., counter-clockwise as viewed in FIG. 1. The bearings, motor, etc. are exactly as utilized in the conventional RING ® press sold by Kamyr, Inc. of Glens Falls, N.Y.

A plurality of channels 18 can be supported by the rotor 25, 26; for example FIG. 2 illustrates an embodiment in which two channels 18 are supported by the rotor 25, 26. Note that conventional seals (e.g. bridging elastomeric or metal sealing material) 30 may be provided between the housing wall 12 and each of the side walls (plates) 20, but preferably open grooves are provided which are filled and compacted with material being acted upon to form a seal.

The device 10 also comprises means for feeding a high consistency mixture of material to be treated into the channel 18 at one portion of the housing 11. Such means—in the exemplary embodiment illustrated—includes the inlet connector 32, which is defined in part by the doctor 16.

The device 10 also comprises an outlet 35 (see FIG. 1) for passage of treated pulp out of the channel 18 and the housing 11 adjacent the restricting adjustable portion 13 of the outer wall 12. The outlet 35 is defined at the top and bottom thereof by the adjustable portion 13 and the doctor blade 16. The doctor blade 16 has approximately the same width as the interior of the channel.

Since the walls 19, 20 of the channel are solid (as is the housing 12), no dewatering action takes place during operation of the device 10. While of course it is normal that there would be some leakage of liquid from the system, the amount of leakage is insubstantial, and the function of the device 10 is essentially to compact the compressible cellulosic mixture rather than to dewater so as to increase the solids content.

General Operation

In operation of the device 10, slurried material to be acted upon is pumped or conveyed by a screw or the like into the inlet connector 32. In the embodiment illustrated in the drawings, two inlet connectors 32 will be provided, one for each channel 18.

As the rotor 25, 26 rotates, the root wall 19, and side walls 20, defining the channel 18, rotate counter-clockwise (FIG. 1), and the compressible mixture rotates with the channel 18.

The restriction formed by the movable wall 13 retards the movement of the cellulosic mixture, and as a result the compressible mixture is compacted and all the void spaces therein are closed up. The compaction is provided by the action of friction of the channel walls 20, 19 against the compressible material, and the compaction becomes progressively greater toward the outlet 35. The compaction causes the compressible material to be tightly compressed, while the liquid remains in the mixture (the liquid being substantially incompressible).

The intensity of the compression is controlled by actuation of the pneumatic cylinder 15, which controls the position of the wall 13 with respect to the doctor blade 16. The pressure applied by the pneumatic cylinder 15 can be adjusted to provide a wide variety of compaction ratios depending upon the material being acted upon, and the end result desired. Ultimately, the compressed material in liquid passes to the doctor blade 16. The doctor blade 16, in addition to forming one wall of each of the inlet 32 and outlet 35, serves to straighten the compressed material and cause it to peel away from the root wall 19, and the side walls 20. The discharged material is then acted on further in any conventional manner desired, and may be discharged onto a conveyor, or into a conduit (pressurized or non-pressurized), or the like, depending upon the material and desired end use.

Specific Procedures

While the device 10 according to the invention may be utilized in a wide variety of procedures and industrial processes, and is not specifically restricted to a particular procedure, there are a number of specific procedures that are particularly desirable that will now be described.

Figure 3:
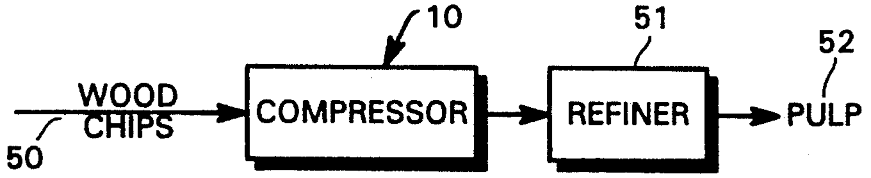
FIGS. 3 through 6 are schematic views illustrating various uses of the compression feeder of FIGS. 1 and 2 in the practice of industrial processes.

FIG. 3 illustrates use of the compression feeder 10 in the production of mechanical paper pulp. The inlet 32 to the compressor 10 is connected to a source of wood chips 50. Wood chips are readily compressible material having a great deal of void space. From the outlet 35 of the compression device 10, the chips are fed to a conventional disc or conical refiner 51, which produces mechanical pulp 52 from the wood chips. The wood chips leave the compressor 10 in the form of a compacted plug, and substantially retard the passage of steam from the refiner 51 back to the inlet to the compressor device 10.

Figure 4:
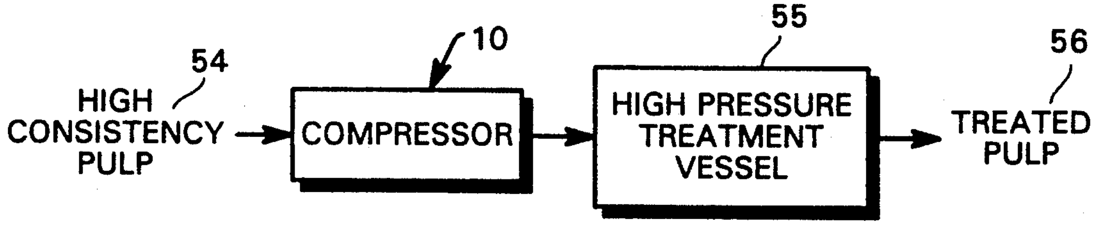

FIG. 4 illustrates a compression device 10 having the inlet 32 thereof connected up to a source of high consistency pulp 54 (i.e. pulp having a consistency of about 16% or greater, e.g. 16–40%). The outlet 35 from the compressing device 10 is connected to the inlet to a high pressure treatment vessel 55 which produces treated pulp 56. The treatment vessel may be a bleaching vessel, steaming vessel, or like vessel for the treatment of cellulosic fibrous material pulp in conventional processes. Again the plug formed by the compression device, that exits the outlet 35, has a high enough compaction ratio to prevent the passage of steam or vapors back through it.

Figure 5:
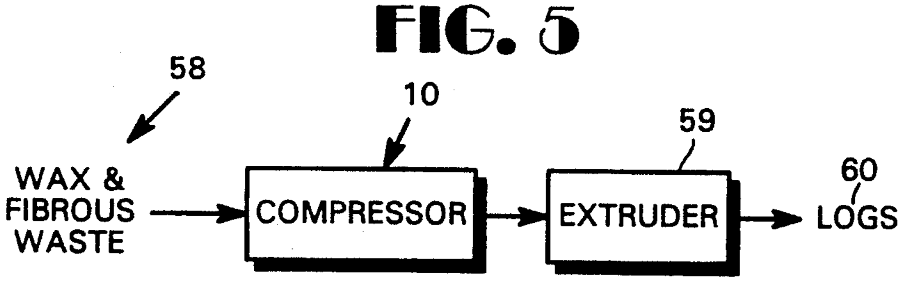

FIG. 5 illustrates a device 10 according to the invention having the inlet 32 thereof connected up to a source 58 of waxes and fibrous waste materials. The waxes will be those conventionally used in the production of artificial fireplace logs, and the fibrous waste material may comprise sawdust, or like fibrous wastes. Other additives, such as binders, colorants, or the like, may also be provided as part of the mass 58, as is conventional. The plug of wax and fibrous waste material that is discharged from the compressor 10 is fed to the inlet a conventional extruder 59 for extruding a wax/fibrous waste material slurry into artificial fireplace logs 60. The compacting action provided by the compression feeder 10 greatly facilitates production of high quality logs 60.

Figure 6:
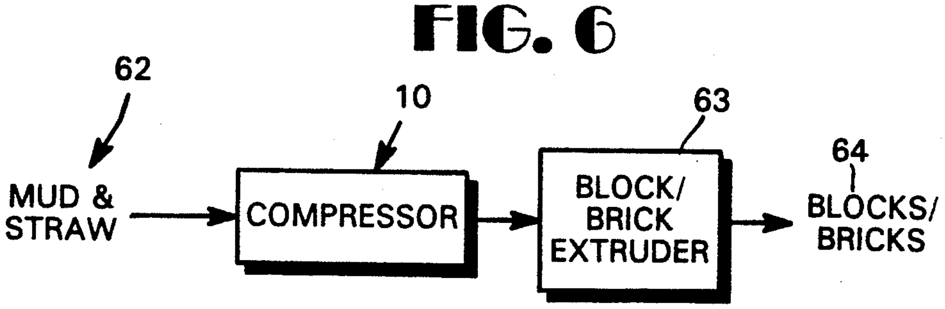

FIG. 6 schematically illustrates a compression feeder 10 according to the invention having the inlet thereof connected up to a source of mud and straw 62. The compression feeder 10 compresses the straw or like filler material, and to some extent the mud, and from the feeder 10 passes to the inlet to a conventional extruder 63 for making bricks or blocks 64. The bricks or blocks 64 will be fired and otherwise treated as is conventional in the production of building materials.

It will thus be seen that according to the present invention, a method and apparatus have been provided for the effective treatment of compressible material to effect compaction thereof into a plug. While the invention has been herein shown and described in what is presently conceived to be the most practical and preferred embodiments, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A device for compacting compressible cellulosic material in a mixture, comprising:

(a) a integral housing having an outer, solid without openings therethrough wall; including a restricting adjustable portion;

(b) means defining a channel having a root wall and a pair of side walls with an open face opposite said root wall, the channel being positioned so that the open face thereof is adjacent said housing outer wall, and of the walls d aid channel being solid without openings therethrough, so that liquid may not pass therethrough;

(c) means for moving said root wall, and at least one of said side walls, with respect to said outer wall in the dimension of elongation of said channel;

(d) means for feeding a mixture of material, and liquid, to be compressed into said channel at an inlet portion of said housing;

(e) an outlet for passage of compressed material, with liquid, out of said channel and said housing adjacent said restricting adjustable portion of said housing outer wall; and (f) means for applying force to said restricting adjustable portion so as to control the amount of compression of the material mixture being compressed.

2. A device as recited in claim 1 wherein said housing outer wall is arcuate, and wherein said root wall is an arcuate wall of a rotor, said side walls extending radially outwardly therefrom; and wherein said means (c) comprises means for rotating said root wall and rotor about a generally horizontal axis.

3. A device as recited in claim 2 further comprising a rotor mounting a plurality of root walls spaced from each other along the axis of rotation of said rotor, each root wall having a pair of side walls with an open face opposite said root wall, said side walls and root wall, cooperating with said housing outer wall, and each including an element (d) and (3).

4. A device as recited in claim 3 wherein said rotor comprises an inner metal tube, a plurality of ribs extending radially outwardly from said inner tube, said arcuate root walls attached to said ribs and radially spaced from said inner tube; and further comprising a shaft keyed to said inner tube.

5. A device as recited in claim 2 wherein said means (f) comprises a pneumatic cylinder.

6. A device as recited in claim 2 having the inlet thereto connected to a source of wax and fibrous waste material, and the outlet therefrom connected to the inlet to an artificial log extruder.

7. A device as recited in claim 2 having the inlet thereto connected to a source of mud and straw, and the outlet therefrom connected to the inlet to a brick or block extruder.

8. A device as recited in claim 2 having the inlet thereto connected to a source of wood chips, and the outlet therefrom connected to the inlet to a refiner for refining wood chips into pulp.

9. A device as recited in claim 2 having the inlet thereto connected to a source of high consistency cellulosic fibrous material pulp, and the outlet therefrom connected to the inlet to a cellulosic fibrous material pulp high pressure treatment vessel.

10. A device as recited in claim 1 wherein said means (e) includes said restricting adjustable portion of said housing outer wall, and a doctor blade disposed on a directly opposite side of the compressed mixture from the adjustable portion.

11. A device as recited in claim 10 wherein said housing outer wall is arcuate, and wherein said root wall is an arcuate wall of a rotor, said side walls extending radially outwardly therefrom; and wherein said means (c) comprises means for rotating said root wall and rotor about a generally horizontal axis.

12. A device as recited in claim 1 wherein said means (f) comprises a pneumatic cylinder.

* * * * *